US008670096B2

(12) United States Patent
Sato et al.

(10) Patent No.: US 8,670,096 B2
(45) Date of Patent: Mar. 11, 2014

(54) LIQUID CRYSTAL DISPLAY DEVICE

(75) Inventors: Takao Sato, Funabashi (JP); Saori Sugiyama, Chosei-gun (JP)

(73) Assignee: Japan Display Inc., Tokyo (JP)

( * ) Notice: Subject to any disclaimer, the term of this patent is extended or adjusted under 35 U.S.C. 154(b) by 69 days.

(21) Appl. No.: 13/311,600

(22) Filed: Dec. 6, 2011

(65) Prior Publication Data

US 2012/0147309 A1 Jun. 14, 2012

(30) Foreign Application Priority Data

Dec. 14, 2010 (JP) ................................. 2010-277653

(51) Int. Cl.
*G02F 1/1333* (2006.01)
*G02F 1/1339* (2006.01)

(52) U.S. Cl.
USPC ............................ 349/138; 349/153; 349/154

(58) Field of Classification Search
USPC ........................... 349/138, 153–154, 189–190
See application file for complete search history.

(56) References Cited

U.S. PATENT DOCUMENTS

| 6,392,735 | B1 * | 5/2002 | Tani .............................. 349/156 |
| 7,068,341 | B2 | 6/2006 | Nakayoshi et al. |
| 7,791,705 | B2 * | 9/2010 | Jang et al. ..................... 349/156 |
| 8,031,320 | B2 * | 10/2011 | Lee et al. ...................... 349/154 |
| 2003/0071955 | A1 * | 4/2003 | Nakayoshi et al. ........... 349/154 |
| 2008/0137024 | A1 * | 6/2008 | Nagami et al. ................ 349/154 |

FOREIGN PATENT DOCUMENTS

JP      2003-121863      4/2003

* cited by examiner

*Primary Examiner* — Bumsuk Won
*Assistant Examiner* — Jia Pan
(74) *Attorney, Agent, or Firm* — Antonelli, Terry, Stout & Kraus, LLP.

(57) ABSTRACT

Provided is a liquid crystal display device, in which: the insulating film includes an extension portion, which extends from an end surface of the insulating film at a position which overlaps a portion of the sealing member forming the liquid crystal injecting port, up to the vicinity of the end surface of the at least one substrate; and the extension portion is formed so that a cross section of the extension portion, which is orthogonal to a thickness direction thereof, is symmetric with respect to a line passing a center of the sealing member in a width direction thereof, and further, a width of the extension portion in the width direction of the sealing member is formed smaller than a width of the sealing member obtained after adhering the pair of substrates to each other.

2 Claims, 13 Drawing Sheets

LIQUID CRYSTAL DISPLAY DEVICE

CROSS-REFERENCE TO RELATED APPLICATION

The present application claims priority from Japanese application JP 2010-277653 filed on Dec. 14, 2010, the content of which is hereby incorporated by reference into this application.

BACKGROUND OF THE INVENTION

1. Field of the Invention

The present invention relates to a liquid crystal display device.

2. Description of the Related Art

Conventionally, in a liquid crystal display device, between a pair of substrates having an insulating film and the like formed thereon, a sealing member for enabling injection of liquid crystal and adhering the pair of substrates to each other is formed, and the liquid crystal is injected from a liquid crystal injecting port formed in the sealing member. Specifically, the sealing member is made of a sealing material such as a thermosetting epoxy resin, and is formed by applying the sealing material on one substrate by a dispenser or the like. The substrate on which the sealing member is applied is adhered to the other substrate. After the pair of substrates are adhered to each other as described above, the liquid crystal is injected into a space surrounded by the pair of substrates and the sealing member via the liquid crystal injecting port, and the liquid crystal injecting port is shut by a liquid crystal encapsulating material.

By the way, each substrate is cut into a predetermined size after the insulating film is formed. Therefore, when a thick insulating film is provided to reach the end surface of the substrate, the cutting property is deteriorated. Further, the insulating film may be peeled, and the peeling and the like may cause intrusion of moisture from outside. Still further, when an ultraviolet (UV) curable resin is used as the liquid crystal encapsulating material, and the liquid crystal encapsulating material is irradiated with UV light to be cured after being applied to the liquid crystal injecting port, the insulating film may hinder the UV light irradiation. In order to solve such problems, there is proposed a liquid crystal display device in which the insulating film is formed up to the vicinity of the end surface of the substrate (for example, see Japanese Patent Application Laid-open No. 2003-121863).

In the liquid crystal display device described in Japanese Patent Application Laid-open No. 2003-121863, as illustrated in FIG. 19, a thick insulating film PAS2, which is formed on one of a pair of substrates SUB1 and SUB2 adhered to each other via a sealing member SL, in this case, the substrate SUB1, extends up to the vicinity of the end surface of the substrate SUB1 without reaching the end surface of the substrate SUB1.

However, there is a difference in thicknesses T1 and T2 between the substrates SUB1 and SUB2 at a liquid crystal injecting port 1 in the vicinity of the end surface of the substrate. Therefore, there occurs a difference in pressure to be applied to the sealing member SL when the substrates SUB1 and SUB2 are adhered to each other. This difference causes, as illustrated in FIG. 18, steps 2 and 2 to be generated at both ends of the sealing member SL in a width direction. As a result, the following problems occur. That is, the steps 2 and 2 become a portion at which air bubbles AIR accumulate at the time of liquid crystal sealing, which causes end surface peeling. In addition, the accumulated air bubbles AIR may enter inside a display region, which causes display failure.

SUMMARY OF THE INVENTION

The present invention has been made in view of the above, and has an object to provide a liquid crystal display device capable of preventing display failure and end surface peeling.

In order to solve the above-mentioned problem and achieve the object, a liquid crystal display device according to a first aspect of the present invention includes: a pair of substrates arranged opposed to each other via liquid crystal; an insulating film formed on at least one substrate of the pair of substrates up to a vicinity of an end surface of the at least one substrate; and a sealing member for enabling injection of the liquid crystal between the pair of substrates and adhering the pair of substrates to each other, the sealing member including a liquid crystal injecting port through which the liquid crystal is injected, in which: the insulating film includes an extension portion, which extends from an end surface of the insulating film at a position which overlaps a portion of the sealing member forming the liquid crystal injecting port, up to the vicinity of the end surface of the at least one substrate on which the insulating film is formed; and the extension portion is formed so that a cross section of the extension portion, which is orthogonal to a thickness direction thereof, is symmetric with respect to a line passing a center of the sealing member in a width direction thereof, and further, a width of the extension portion in the width direction of the sealing member is formed smaller than a width of the sealing member obtained after adhering the pair of substrates to each other.

Further, in the liquid crystal display device according to the first aspect of the present invention, the insulating film is made of an organic material.

In order to solve the above-mentioned problem and achieve the object, a liquid crystal display device according to a second aspect of the present invention includes: a pair of substrates arranged opposed to each other via liquid crystal; an insulating film formed on at least one substrate of the pair of substrates up to a vicinity of an end surface of the at least one substrate; and a sealing member for enabling injection of the liquid crystal between the pair of substrates and adhering the pair of substrates to each other, the sealing member including a liquid crystal injecting port through which the liquid crystal is injected, in which: the insulating film includes an extension portion, which extends from an end surface of the insulating film at a position which overlaps a portion of the sealing member forming the liquid crystal injecting port, to reach the end surface of the at least one substrate on which the insulating film is formed; and the extension portion is formed so that a cross section of the extension portion, which is orthogonal to a thickness direction thereof, is symmetric with respect to a line passing a center of the sealing member in a width direction thereof, and further, a width of the extension portion in the width direction of the sealing member is formed equal to or larger than a width of the sealing member obtained after adhering the pair of substrates to each other.

Further, in the liquid crystal display device according to the second aspect of the present invention, the insulating film is made of an organic material.

In order to solve the above-mentioned problem and achieve the object, a liquid crystal display device according to a third aspect of the present invention includes: a pair of substrates arranged opposed to each other via liquid crystal; an insulating film formed on at least one substrate of the pair of substrates up to a vicinity of an end surface of the at least one substrate; and a sealing member for enabling injection of the liquid crystal between the pair of substrates and adhering the pair of substrates to each other, the sealing member including a liquid crystal injecting port through which the liquid crystal is injected, in which the insulating film includes a thin film portion, which is formed so that a surface on the liquid crystal side comes close to a surface on an opposite side, from an inner side with respect to an end surface of the insulating film at a position which overlaps a portion of the sealing member forming the liquid crystal injecting port, toward the end surface of the insulating film.

Further, in the liquid crystal display device according to the third aspect of the present invention, the thin film portion includes a portion of the insulating film, in which the surface on the liquid crystal side is formed in a stepped manner.

Further, in the liquid crystal display device according to the third aspect of the present invention, the thin film portion includes a portion of the insulating film, in which the surface on the liquid crystal side is formed to be inclined.

Further, in the liquid crystal display device according to the third aspect of the present invention, the insulating film is made of an organic material.

In order to solve the above-mentioned problem and achieve the object, a liquid crystal display device according to a fourth aspect of the present invention includes: a pair of substrates arranged opposed to each other via liquid crystal; an insulating film formed on at least one substrate of the pair of substrates up to a vicinity of an end surface of the at least one substrate; a sealing member for enabling injection of the liquid crystal between the pair of substrates and adhering the pair of substrates to each other, the sealing member including a liquid crystal injecting port through which the liquid crystal is injected; and a protruding portion formed at a portion of one substrate of the pair of substrates, which overlaps a portion of the sealing member forming the liquid crystal injecting port, the protruding portion protruding from a surface of the one substrate of the pair of substrates on the liquid crystal side toward a surface of another substrate of the pair of substrates on the liquid crystal side, in which the protruding portion is arranged between the end surface of the at least one substrate on which the insulating film is formed and an end surface of the insulating film, and further, the protruding portion is formed so that a cross section of the protruding portion, which is orthogonal to a thickness direction thereof, is symmetric with respect to a line passing a center of the sealing member in a width direction thereof.

Further, in the liquid crystal display device according to the fourth aspect of the present invention, the protruding portion has a thickness in a protruding direction equal to a thickness of the insulating film.

Further, in the liquid crystal display device according to the fourth aspect of the present invention, the protruding portion has a width in the width direction of the sealing member, which is equal to or larger than a width of the sealing member obtained after adhering the pair of substrates to each other.

Further, in the liquid crystal display device according to the fourth aspect of the present invention, the insulating film is made of an organic material.

In the liquid crystal display device according to the first aspect of the present invention, the insulating film includes the extension portion, which extends from the end surface of the insulating film at the position which overlaps the portion of the sealing member forming the liquid crystal injecting port, up to the vicinity of the end surface of the at least one substrate. Further, the extension portion is formed so that the cross section of the extension portion, which is orthogonal to the thickness direction thereof, is symmetric with respect to the line passing the center of the sealing member in the width direction thereof, and further, the width of the extension portion in the width direction of the sealing member is formed smaller than the width of the sealing member obtained after adhering the pair of substrates to each other. As a result, in a center region of the sealing member in the width direction, the thickness between the pair of substrates becomes uniform up to the vicinity of the end surface of the at least one substrate on which the insulating film is formed. In this manner, it is possible to suppress generation of steps at both ends of the sealing member in the width direction. Therefore, it is possible to prevent air bubbles from entering, and as a result, it is possible to prevent display failure and end surface peeling.

Further, in the liquid crystal display device according to the second aspect of the present invention, the insulating film includes the extension portion, which extends from the end surface of the insulating film at the position which overlaps the portion of the sealing member forming the liquid crystal injecting port, to reach the end surface of the at least one substrate on which the insulating film is formed. Further, the extension portion is formed so that the cross section of the extension portion, which is orthogonal to the thickness direction thereof, is symmetric with respect to the line passing the center of the sealing member in the width direction thereof, and further, the width of the extension portion in the width direction of the sealing member is formed equal to or larger than the width of the sealing member obtained after adhering the pair of substrates to each other. As a result, in a region where the sealing member is formed, the thickness between the pair of substrates becomes uniform up to the end surfaces of the pair of substrates. In this manner, it is possible to suppress generation of steps at both the end portions of the sealing member in the width direction. Therefore, it is possible to prevent air bubbles from entering, and as a result, it is possible to prevent display failure and end surface peeling.

Further, in the liquid crystal display device according to the third aspect of the present invention, the insulating film includes the thin film portion formed so that the surface on the liquid crystal side comes close to the surface on the opposite side, from the inner side with respect to the end surface of the insulating film toward the end surface. Therefore, in the region where the sealing member is formed, the thickness between the pair of substrates becomes smaller toward the end surfaces of the pair of substrates. In this manner, when the pair of substrates are adhered to each other, a pressure difference to be applied to the sealing member with the end surface of the insulating film being a boundary may be relieved to suppress generation of steps at both the end portions of the sealing member in the width direction. Therefore, it is possible to prevent air bubbles from entering, and as a result, it is possible to prevent display failure and end surface peeling.

Further, the liquid crystal display device according to the fourth aspect of the present invention includes the protruding portion, which is formed at the position which overlaps the portion of the sealing member forming the liquid crystal injecting port, the protruding portion protruding from the one substrate of the pair of substrates on the liquid crystal side toward the another substrate of the pair of substrates on the liquid crystal side. Further, the protruding portion is arranged between the end surface of the at least one substrate on which the insulating film is formed and the end surface of the insulating film, and further, the cross section of the protruding portion, which is orthogonal to the thickness direction thereof, is symmetric with respect to the line passing the center of the sealing member in the width direction thereof. As a result, owing to the protruding portion, it is possible to increase the thickness between the pair of substrates at a position of the center of the sealing member in the width direction. In this manner, it is possible to suppress generation of steps at both the end portions of the sealing member in the width direction. Therefore, it is possible to prevent air bubbles from entering, and as a result, it is possible to prevent display failure and end surface peeling.

DETAILED DESCRIPTION OF THE INVENTION

Hereinafter, exemplary embodiments of a liquid crystal display device according to the present invention are described in detail with reference to the drawings.

First Embodiment

Figure 1:
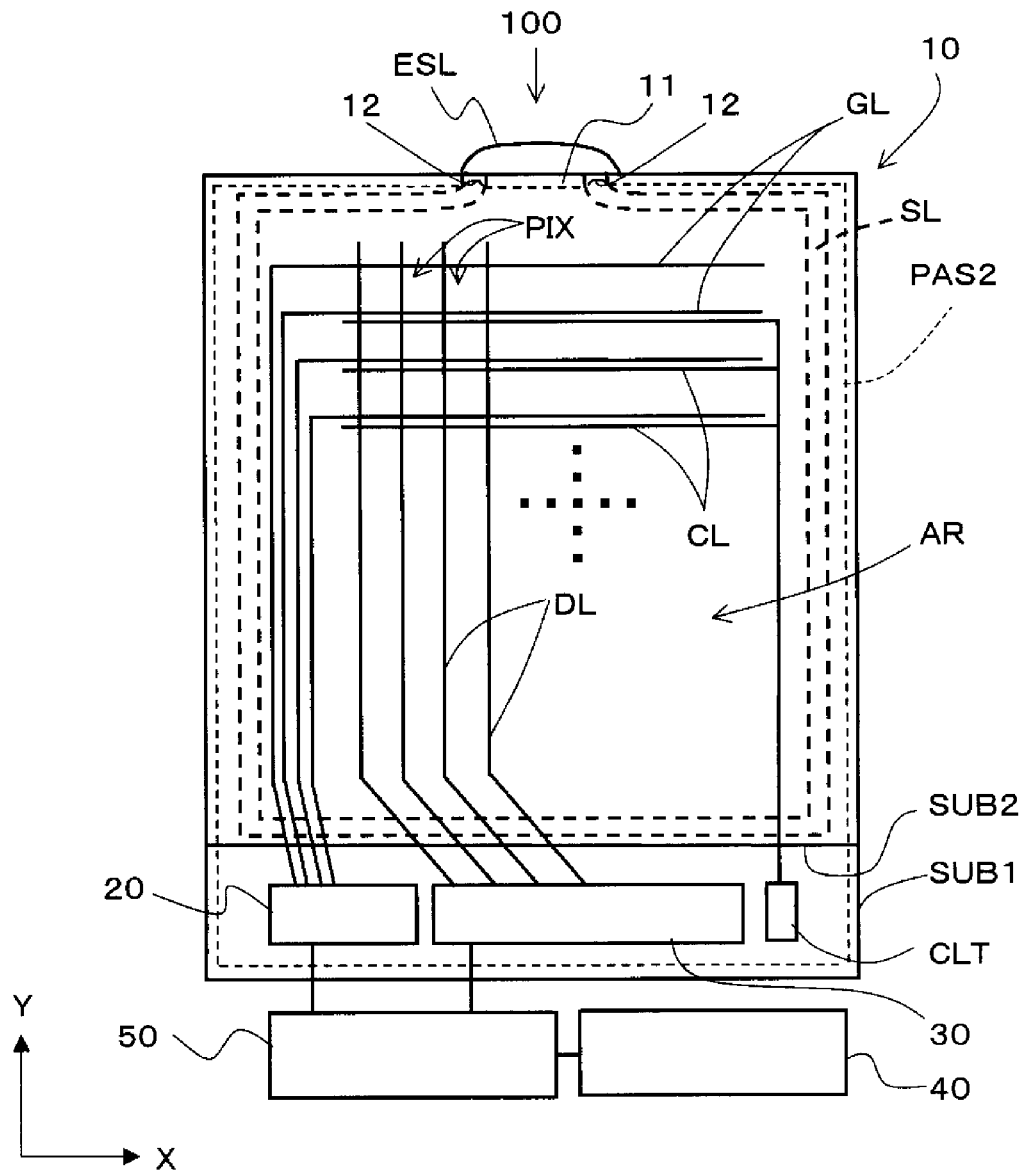
FIG. 1 is a schematic view illustrating a structure of a liquid crystal display device according to a first embodiment of the present invention.

FIG. 1 is a schematic view illustrating a structure of a liquid crystal display device according to a first embodiment of the present invention. Note that, as for an insulating film, only an insulating film PAS2 is illustrated in FIG. 1. A liquid crystal display device 100 is a lateral electric field driving (so-called in-plane switching (IPS)) liquid crystal display device. As illustrated in FIG. 1, the liquid crystal display device 100 includes a liquid crystal display panel 10, a scanning signal drive circuit 20, a video signal drive circuit 30, a backlight unit 40, and a control portion 50.

The liquid crystal display panel 10 includes a pair of substrates SUB1 and SUB2. The substrates SUB1 and SUB2 are each a transparent glass substrate, and are arranged opposed to each other via liquid crystal LC. The substrate SUB1 has a larger area than that of the substrate SUB2. The scanning signal drive circuit 20 and the video signal drive circuit 30 are mounted onto the part of the substrate SUB1 exposed from the substrate SUB2. The liquid crystal LC is injected between the substrate SUB1 and the substrate SUB2 with the use of a sealing member SL.

The sealing member SL is made of a thermosetting resin, and is annularly formed along the periphery of the end surface of the substrate SUB2. The sealing member SL has a function of, as described above, enabling injection of the liquid crystal LC between the substrate SUB1 and the substrate SUB2, and also a function of adhering the substrate SUB1 and the substrate SUB2 to each other.

Further, the sealing member SL has a liquid crystal injecting port 11. The liquid crystal injecting port 11 is an opening formed in the sealing member SL, and is an injecting port used when the liquid crystal LC is injected into a space formed by the sealing member SL between the substrate SUB1 and the substrate SUB2. The liquid crystal injecting port 11 is encapsulated by a liquid crystal encapsulating material ESL after the liquid crystal LC is injected. As the liquid crystal encapsulating material ESL, an ultraviolet (UV) curable resin is used. The liquid crystal encapsulating material ESL is applied to the liquid crystal injecting port 11, and then is irradiated with UV light to be cured.

Further, the liquid crystal display panel 10 includes a plurality of gate signal lines GL and a plurality of drain signal lines DL. The gate signal lines GL extend in an X direction of FIG. 1 and are arranged in parallel in a Y direction of FIG. 1 on a surface of the substrate SUB1 on the liquid crystal LC side in a display region AR. The drain signal lines DL extend in the Y direction of FIG. 1 and are arranged in parallel in the X direction of FIG. 1 in a manner of being insulated from the gate signal lines GL. Each region surrounded by those signal lines GL and DL forms each pixel region.

The scanning signal drive circuit 20 sequentially supplies scanning signals to the respective gate signal lines GL, for example, from the upper side to the lower side of FIG. 1. Each of the gate signal lines GL has one end, which extends beyond the sealing member SL and is connected to the scanning signal drive circuit 20.

The video signal drive circuit 30 supplies video signals to the respective drain signal lines DL in synchronized timing with the supply of the scanning signals.

The backlight unit 40 includes a light-emitting diode and the like, and illuminates the liquid crystal display panel 10 from the rear surface side thereof.

The control portion 50 includes a CPU and the like, and is electrically connected to respective parts of the liquid crystal display device 100, to thereby control the entire operation of the liquid crystal display device 100. Further, the control portion 50 includes, for example, a memory (not shown) for temporarily storing video data input from an outer system.

Figure 2:
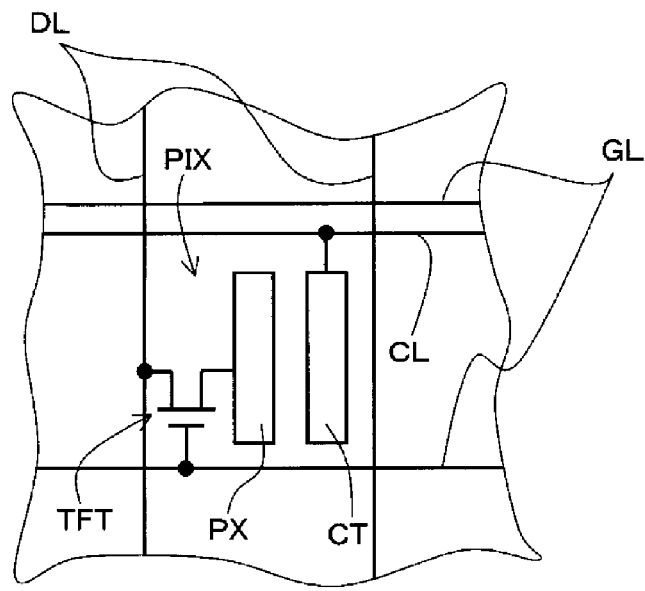
FIG. 2 is an equivalent circuit diagram illustrating a pixel structure of a liquid crystal display panel illustrated in FIG. 1.

Here, the liquid crystal display panel 10 is described in more detail. First, with reference to FIG. 2, a pixel structure of the liquid crystal display panel 10 is described. FIG. 2 is an equivalent circuit diagram illustrating the pixel structure of the liquid crystal display panel 10 illustrated in FIG. 1. The liquid crystal display panel 10 includes, as illustrated in FIG. 2, a pixel PIX, which corresponds to a region surrounded by a pair of adjacent gate signal lines GL and a pair of adjacent drain signal lines DL. The pixel PIX includes a thin film transistor TFT, a pixel electrode PX, and a counter electrode CT.

The thin film transistor TFT is turned ON in response to the scanning signal supply from one of the adjacent gate signal lines GL. The pixel electrode PX is supplied with a video signal from one of the adjacent drain signal lines DL via the turned-ON thin film transistor TFT. The counter electrode CT generates an electric field together with the pixel electrode PX. The counter electrode CT is connected to a common signal line CL that is provided in common to the pixels PIX in each pixel PIX row. Each common signal line CL extends, as illustrated in FIG. 1, beyond the sealing member SL and is connected to a common terminal CLT provided on the substrate SUB1. With this structure, the counter electrode CT is applied with, via the common terminal CLT, a signal (voltage) which becomes a reference with respect to the video signal.

Figure 3:
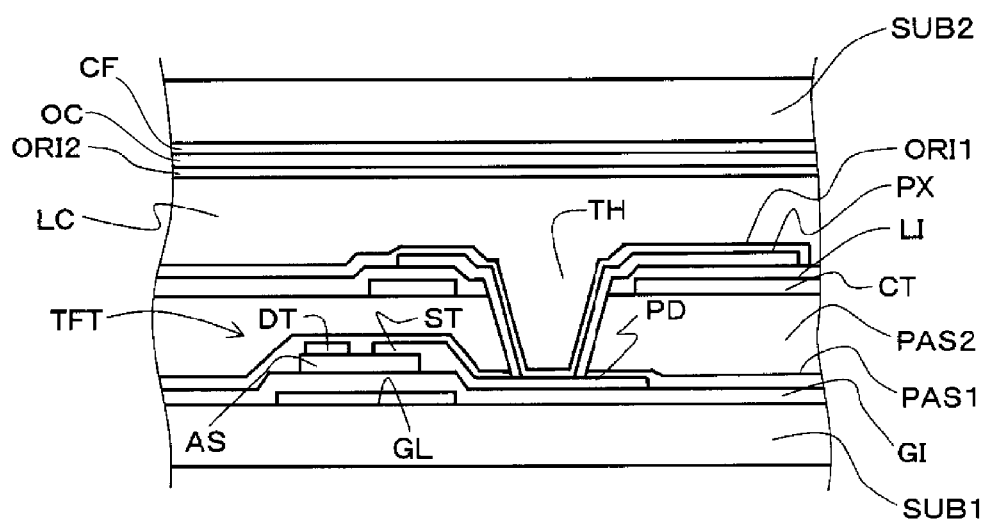
FIG. 3 is a main-part sectional view of the liquid crystal display panel illustrated in FIG. 1.

Next, with reference to FIG. 3, a sectional structure of the liquid crystal display panel 10 is described. FIG. 3 is a main-part sectional view of the liquid crystal display panel 10 illustrated in FIG. 1.

In the liquid crystal display panel 10, the gate signal line GL is formed on the surface of the substrate SUB1 on the liquid crystal LC side. On the surface of the substrate SUB1, an insulating film GI covering the surface of the substrate SUB1 as well as the gate signal line GL is formed. The insulating film GI is made of an inorganic material such as silicon nitride, and functions as a gate insulating film in a region where the thin film transistor TFT is formed.

On the surface of the insulating film GI on the liquid crystal LC side in a region where the thin film transistor TFT is formed, the region being formed so as to overlap a part of the gate signal line GL, a semiconductor layer AS made of, for example, amorphous silicon is formed. In the thin film transistor TFT, a drain electrode DT and a source electrode ST, which are arranged opposed to each other, are formed on the surface of the semiconductor layer AS. In this manner, an inversely staggered transistor in which a part of the gate signal line GL serves as a gate electrode is formed.

The drain electrode DT is formed by extending a part of the drain signal line DL onto the surface of the semiconductor layer AS. That is, the drain signal line DL is formed on the surface of the insulating film GI on the liquid crystal LC side. Further, the source electrode ST is formed when the drain signal line DL is formed. The source electrode ST includes a pad portion PD extending in the pixel region beyond the region where the semiconductor layer AS is formed. The pad portion PD is a portion electrically connected to the pixel electrode PX.

Further, on the upper surface of the drain electrode DT (drain signal line DL) and the like, an insulating film PAS is formed. The insulating film PAS has a lamination structure formed of an insulating film PAS1 made of an inorganic material such as silicon nitride and the insulating film PAS2 made of an organic material such as a resin. The insulating film PAS1 has a thickness of about 30 nm. Further, the insulating film PAS2 has a thickness of about 2 μm, which is larger than the insulating film PAS1. Therefore, in view of the above-mentioned problem of cutting property and the like, the insulating film PAS2 is not formed to reach the end surface of the substrate SUB1 and is formed up to the vicinity of the end surface of the substrate SUB1.

The common signal line CL is formed on the surface of the insulating film PAS2. The common signal line CL also serves as the counter electrode CT. The common signal line CL (counter electrode CT) is formed of a translucent conductive film such as an indium tin oxide (ITO) film. On the upper portion of the common signal line CL (counter electrode CT) and the like, an insulating film LI made of an inorganic material is formed.

The insulating film LI has a thickness of about 300 nm. The pixel electrode PX is formed in each pixel region on the upper surface of the insulating film LI. The insulating film LI functions as a film insulating the pixel electrode PX and the counter electrode CT from each other. The pixel electrode PX is formed of a translucent conductive film such as an indium tin oxide (ITO) film. The pixel electrode PX is electrically connected to the pad portion PD of the source electrode ST via a through hole TH formed so as to pass through the insulating film LI and the insulating film PAS. On the upper portion of the pixel electrode PX and the like, an orientation film ORI1 is formed. The orientation film ORI1 determines an initial orientation direction of the liquid crystal LC.

On the surface of the substrate SUB2 on the liquid crystal LC side, a color filter CF, a protective film OC, and an orientation film ORI2 are formed in the stated order.

The color filter CF is formed by periodically arraying, at opening regions of a light shielding film, a filter for red (R) display, a filter for green (G) display, and a filter for blue (B) display. The protective film OC is a film for protecting the surface of the color filter CF. The orientation film ORI2 determines an initial orientation direction of the liquid crystal LC.

Figure 4:
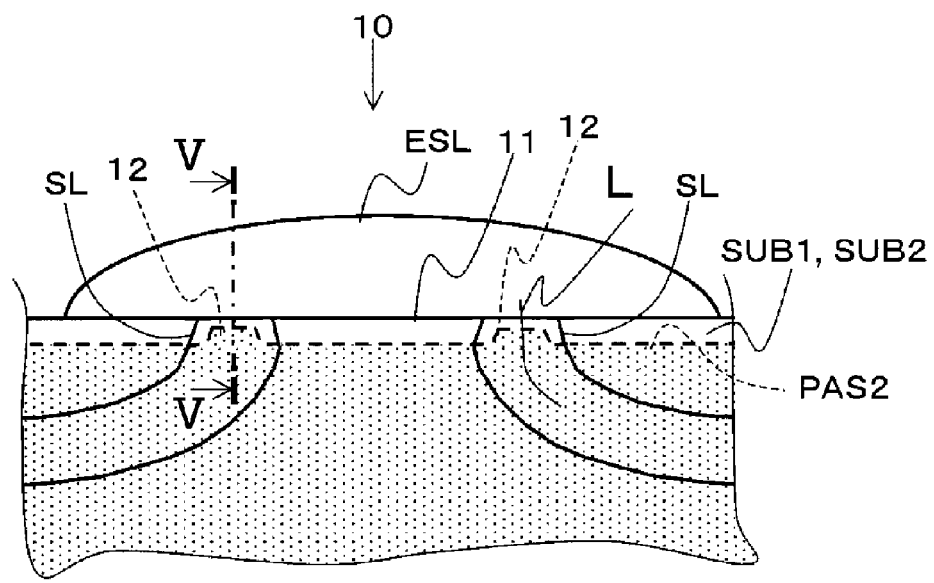
FIG. 4 is an enlarged view of a vicinity of a liquid crystal injecting port of the liquid crystal display panel illustrated in FIG. 1.
Figure 5:
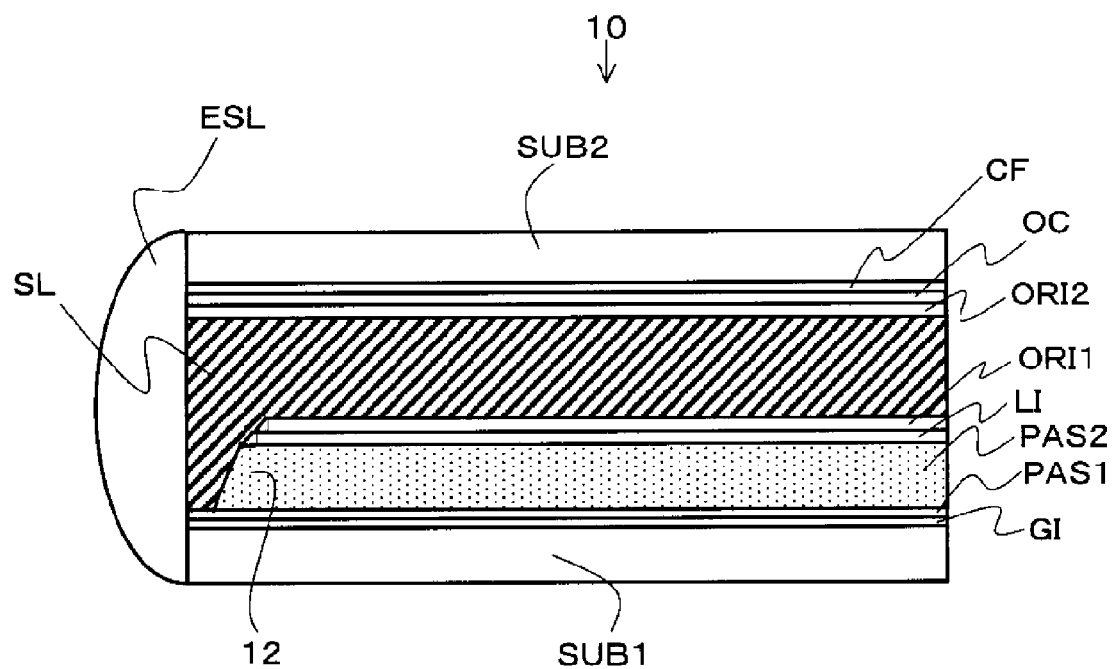
FIG. 5 is a sectional view taken along the line V-V in the vicinity of the liquid crystal injecting port illustrated in FIG. 4.

Next, with reference to FIGS. 4 and 5, a structure in the vicinity of the liquid crystal injecting port 11 is described in detail. FIG. 4 is an enlarged view of the vicinity of the liquid crystal injecting port 11 of the liquid crystal display panel 10 illustrated in FIG. 1. FIG. 5 is a sectional view taken along the line V-V in the vicinity of the liquid crystal injecting port 11 illustrated in FIG. 4.

The insulating film PAS2 includes an extension portion 12. The extension portion 12 is a portion formed so as to extend from the end surface of the insulating film PAS2 at a position which overlaps a portion of the sealing member SL forming the liquid crystal injecting port 11, up to the vicinity of the end surface of the substrate SUB1.

The extension portion 12 is formed into a trapezoidal shape in which a cross section of the extension portion 12, which is orthogonal to a thickness direction thereof, is symmetric with respect to a line L passing a center of the sealing member SL in a width direction thereof. Further, the width of the extension portion 12 in the width direction of the sealing member SL is set smaller than the width of the sealing member SL obtained after the pair of substrates SUB1 and SUB2 are adhered to each other, that is, after the sealing member SL is pressed to expand (hereinafter, referred to as width after expansion). The extension portion 12 is formed by a photolithography method. Note that, the insulating film LI and the orientation film ORI1 have such thicknesses that do not cause the above-mentioned problem of the cutting property and the like, and hence the insulating film LI and the orientation film ORI1 may be formed to reach the end surface of the substrate SUB1.

Figure 6A:
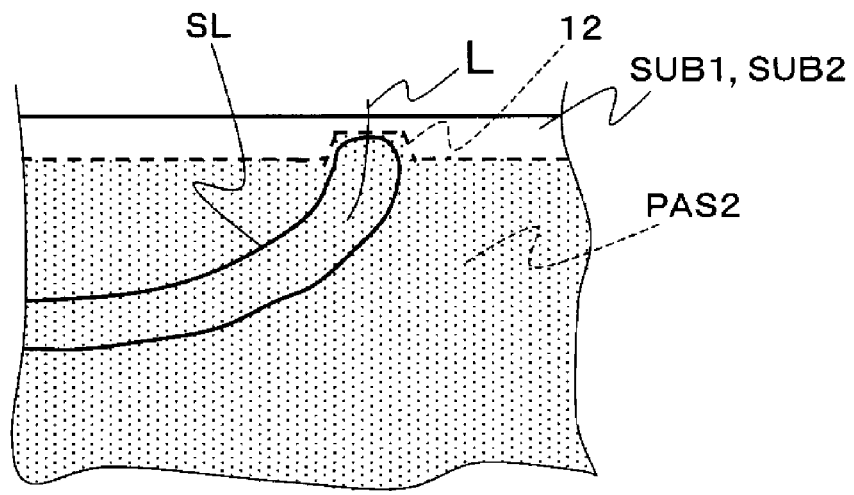
FIGS. 6A and 6B are views illustrating states of a sealing member before and after substrates are adhered to each other.
Figure 6B:
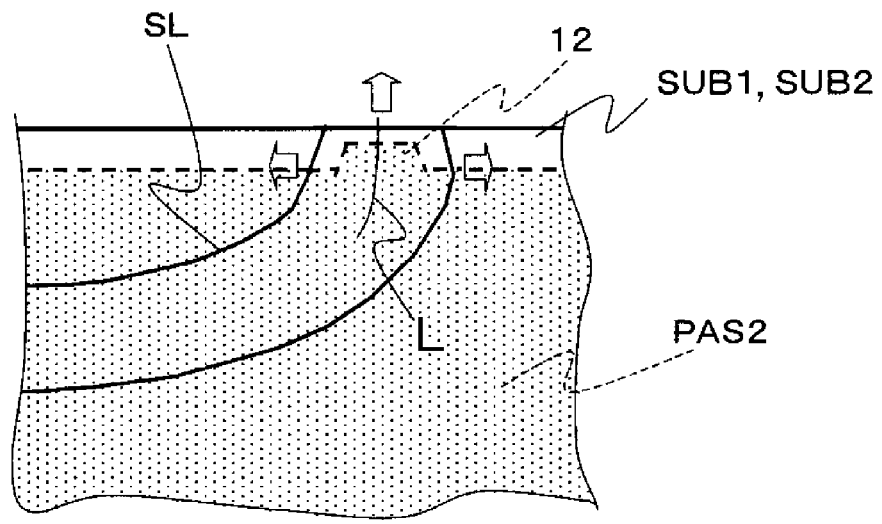

Here, change of the sealing member SL in the width direction thereof before and after the substrates SUB1 and SUB2 are adhered to each other is described with reference to FIGS. 6A and 6B. FIGS. 6A and 6B are views illustrating states of the sealing member SL before and after the substrates SUB1 and SUB2 are adhered to each other.

As compared to the state before the substrates SUB1 and SUB2 are adhered to each other (see FIG. 6A), after the adhesion (see FIG. 6B), the sealing member SL expands in the width direction and the extending direction with the pressure applied during the adhesion. Owing to the extension portion 12, a pressure which causes expansion of the sealing member SL in the width direction is applied up to the vicinity of the end surfaces of the substrates SUB1 and SUB2, and hence the sealing member SL expands in the width direction without a step. Further, the extension portion 12 is formed so that the cross section of the extension portion 12, which is orthogonal to the thickness direction thereof, is symmetric with respect to the line L, and hence the sealing member SL can uniformly expand in the width direction. That is, the extension portion 12 can be used to suppress generation of steps at both ends of the sealing member SL in the width direction.

In the liquid crystal display device 100 according to the first embodiment of the present invention, the insulating film PAS2 includes the extension portion 12, which extends from the end surface of the insulating film PAS2 at the position which overlaps the portion of the sealing member SL forming the liquid crystal injecting port 11, up to the vicinity of the end surface of the substrate SUB1. Further, the extension portion 12 is formed so that the cross section of the extension portion 12, which is orthogonal to the thickness direction thereof, is symmetric with respect to the line L passing the center of the sealing member SL in the width direction thereof, and further, the width of the extension portion 12 in the width direction of the sealing member SL is formed smaller than the width of the sealing member SL obtained after adhering the pair of substrates to each other. As a result, in the center region of the sealing member SL in the width direction, the thickness between the pair of substrates SUB1 and SUB2 becomes uniform up to the vicinity of the end surface of the substrate SUB1 on which the insulating film PAS2 is formed. In this manner, it is possible to suppress generation of steps at both the ends of the sealing member SL in the width direction. Therefore, it is possible to prevent air bubbles from entering, and as a result, it is possible to prevent display failure and end surface peeling.

Modified Example

Figure 7:
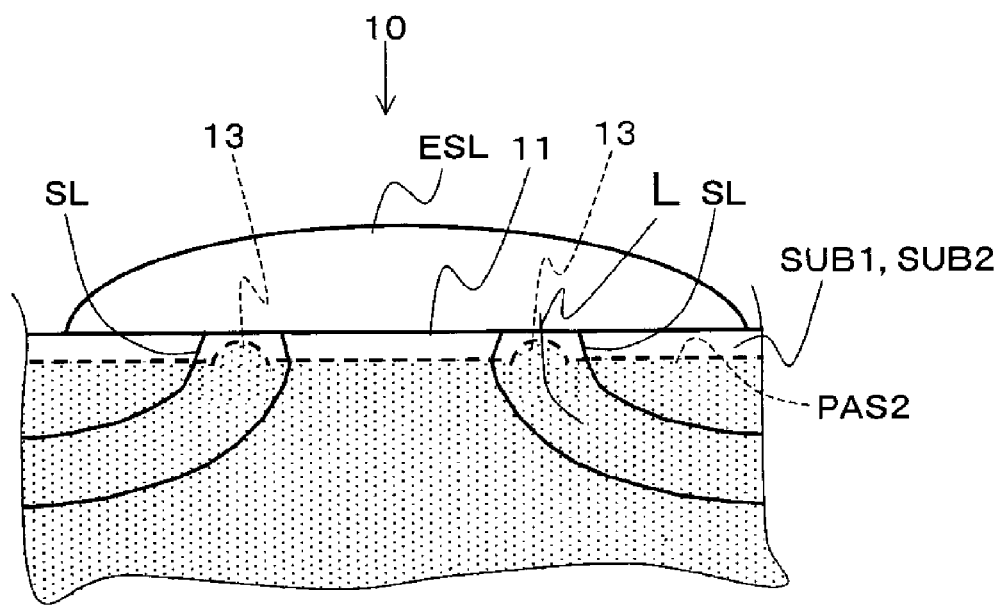
FIG. 7 is a view illustrating a liquid crystal display device according to a modified example of the first embodiment of the present invention.

Here, a modified example of the first embodiment of the present invention is described. FIG. 7 is a view illustrating the liquid crystal display device 100 according to the modified example of the first embodiment of the present invention. In this modified example, the insulating film PAS2 includes an extension portion 13 instead of the extension portion 12. As illustrated in FIG. 7, the extension portion 13 is formed into a semicircular shape in which a cross section of the extension portion 13, which is orthogonal to a thickness direction thereof, is symmetric with respect to the line L passing the center of the sealing member SL in the width direction thereof. Other structures are the same as those in the first embodiment. Therefore, also in this modified example, similar effects as those in the first embodiment can be produced.

Second Embodiment

Figure 8:
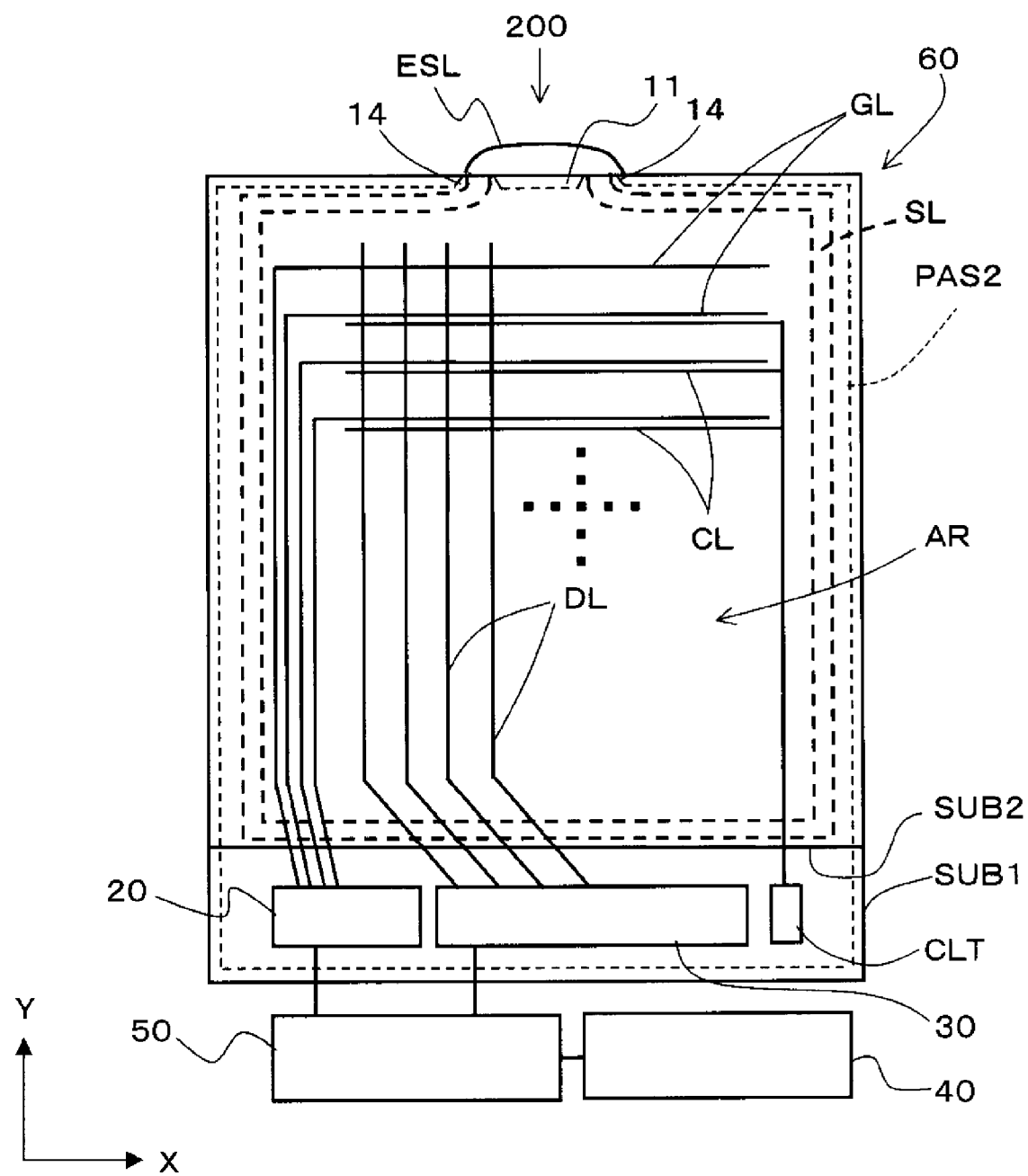
FIG. 8 is a schematic view illustrating a structure of a liquid crystal display device according to a second embodiment of the present invention.
Figure 9:
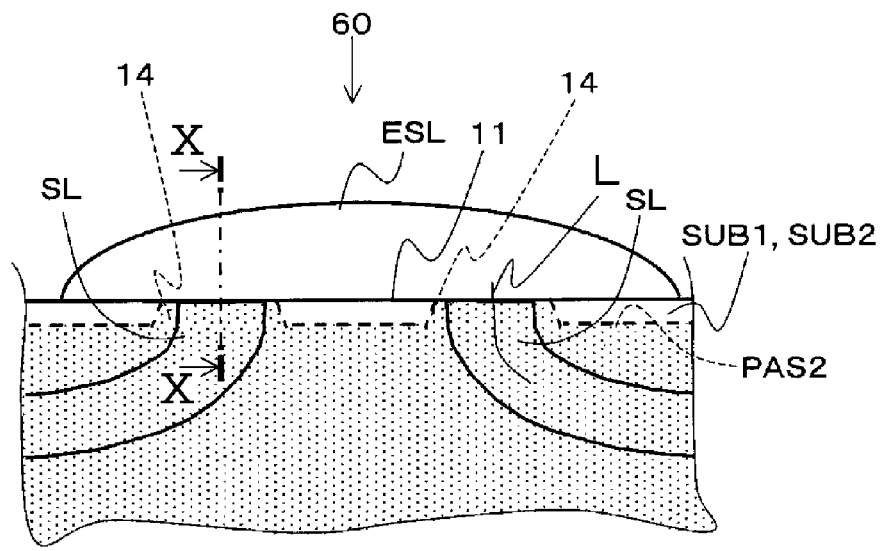
FIG. 9 is an enlarged view of a vicinity of a liquid crystal injecting port illustrated in FIG. 8.
Figure 10:
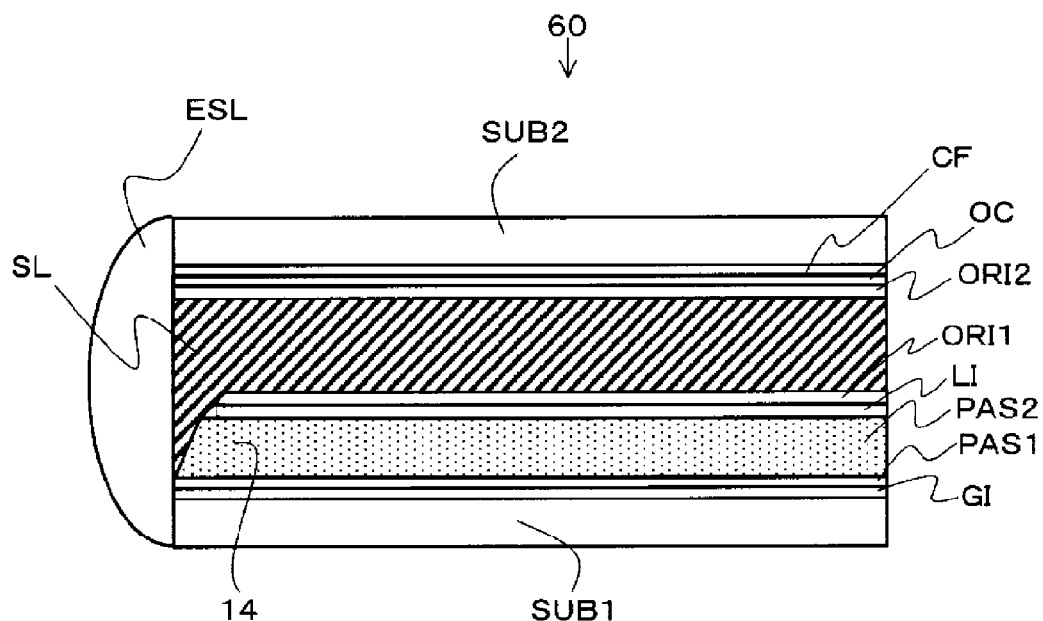
FIG. 10 is a sectional view taken along the line X-X in the vicinity of the liquid crystal injecting port illustrated in FIG. 9.

Next, a liquid crystal display device according to a second embodiment of the present invention is described. FIG. 8 is a schematic view illustrating a structure of a liquid crystal display device 200 according to the second embodiment of the present invention. FIG. 9 is an enlarged view of the vicinity of the liquid crystal injecting port 11 illustrated in FIG. 8. FIG. 10 is a sectional view taken along the line X-X in the vicinity of the liquid crystal injecting port 11 illustrated in FIG. 9. Note that, as for the insulating film, only the insulating film PAS2 is illustrated in FIG. 8.

In the liquid crystal display device 100 according to the first embodiment of the present invention, the extension portion 12 extends up to the vicinity of the end surface of the substrate SUB1, and the width of the extension portion 12 in the width direction of the sealing member SL is set smaller than the width of the sealing member SL after expansion. Alternatively, in the liquid crystal display device 200 of the second embodiment, the insulating film PAS2 includes an extension portion 14 instead of the extension portion 12. The extension portion 14 extends to reach the end surface of the substrate SUB1, and the width of the extension portion 14 in the width direction of the sealing member SL is set larger than the width of the sealing member SL after expansion. Other structures are the same as those in the first embodiment, and portions having the same structures are denoted by the same reference symbols.

The extension portion 14 is a portion formed so as to extend from the end surface of the insulating film PAS2 at the position which overlaps the portion of the sealing member SL forming the liquid crystal injecting port 11, to reach the end surface of the substrate SUB1.

The extension portion 14 is formed so that a cross section of the extension portion 14, which is orthogonal to a thickness direction thereof, is symmetric with respect to the line L passing the center of the sealing member SL in the width direction thereof. Further, the width of the extension portion 14 in the width direction of the sealing member SL is set larger than the width of the sealing member SL after expansion. The extension portion 14 is formed by a photolithography method.

In the liquid crystal display device 200 according to the second embodiment of the present invention, the insulating film PAS2 includes the extension portion 14, which extends from the end surface of the insulating film PAS2 at the position which overlaps the portion of the sealing member SL forming the liquid crystal injecting port 11, to reach the end surface of the substrate SUB1 on which the insulating film PAS2 is formed. Further, the extension portion 14 is formed so that the cross section of the extension portion 14, which is orthogonal to the thickness direction thereof, is symmetric with respect to the line L passing the center of the sealing member SL in the width direction thereof, and further, the width of the extension portion 14 in the width direction of the sealing member SL is formed larger than the width of the sealing member SL obtained after adhering the pair of substrates SUB1 and SUB2 to each other. As a result, in the region where the sealing member SL is formed, the thickness between the pair of substrates SUB1 and SUB2 becomes uniform up to the end surface of the pair of substrates. In this manner, it is possible to suppress generation of steps at both the ends of the sealing member SL in the width direction. Therefore, it is possible to prevent air bubbles from entering, and as a result, it is possible to prevent display failure and end surface peeling.

Note that, in the second embodiment of the present invention, the extension portion 14 has, similarly to the extension portion 12, a trapezoidal shape in a cross section orthogonal to the thickness direction thereof. However, the present invention is not limited thereto. That is, similarly to the modified example of the first embodiment, the extension portion 14 may have a semicircular shape in a cross section orthogonal to the thickness direction thereof.

Further, in the second embodiment of the present invention, description is made of an example in which the width of the extension portion 14 in the width direction of the sealing member SL is formed larger than the width of the sealing member SL obtained after adhering the pair of substrates SUB1 and SUB2 to each other. However, the present invention is not limited thereto. The width of the extension portion 14 in the width direction of the sealing member SL may be formed equal to the width of the sealing member SL obtained after adhering the pair of substrates SUB1 and SUB2 to each other.

Third Embodiment

Figure 11:
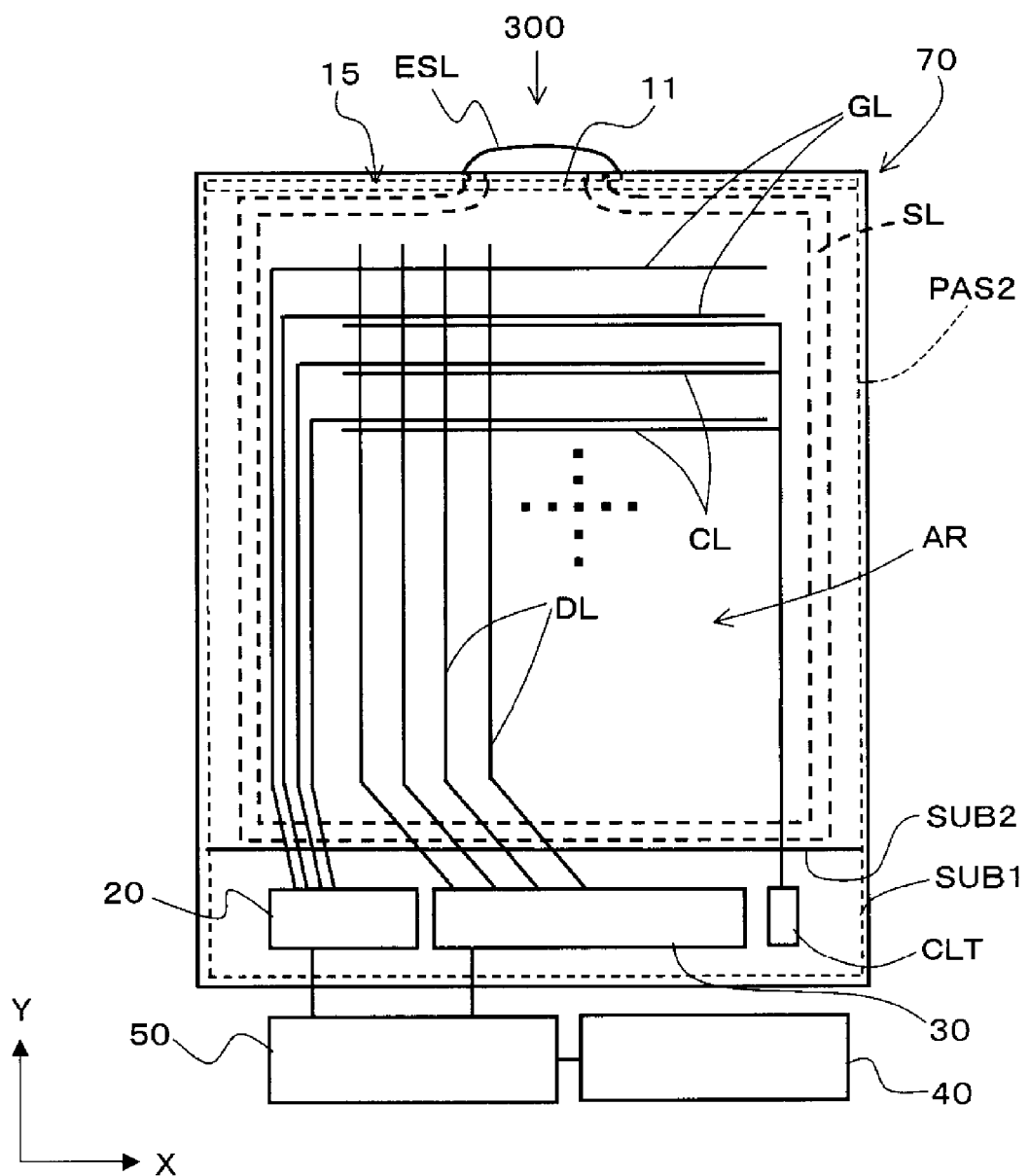
FIG. 11 is a schematic view illustrating a structure of a liquid crystal display device according to a third embodiment of the present invention.
Figure 12:
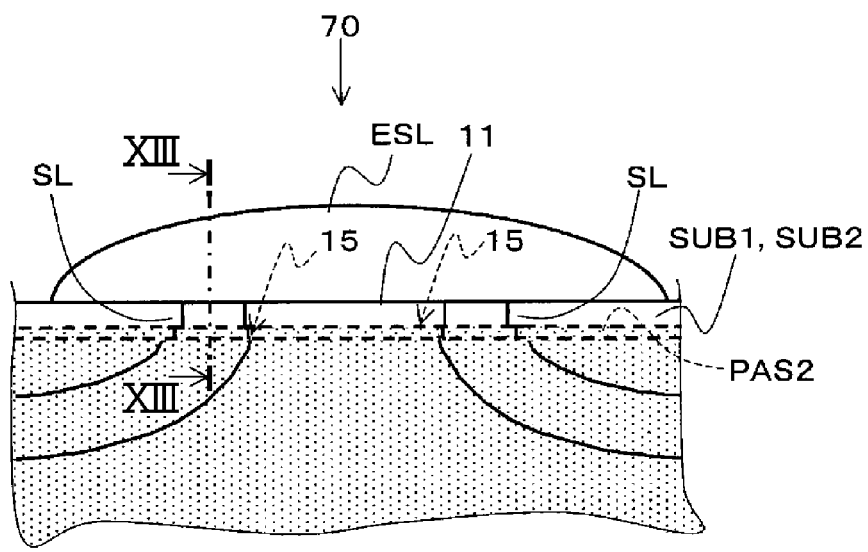
FIG. 12 is an enlarged view of a vicinity of a liquid crystal injecting port illustrated in FIG. 11.
Figure 13:
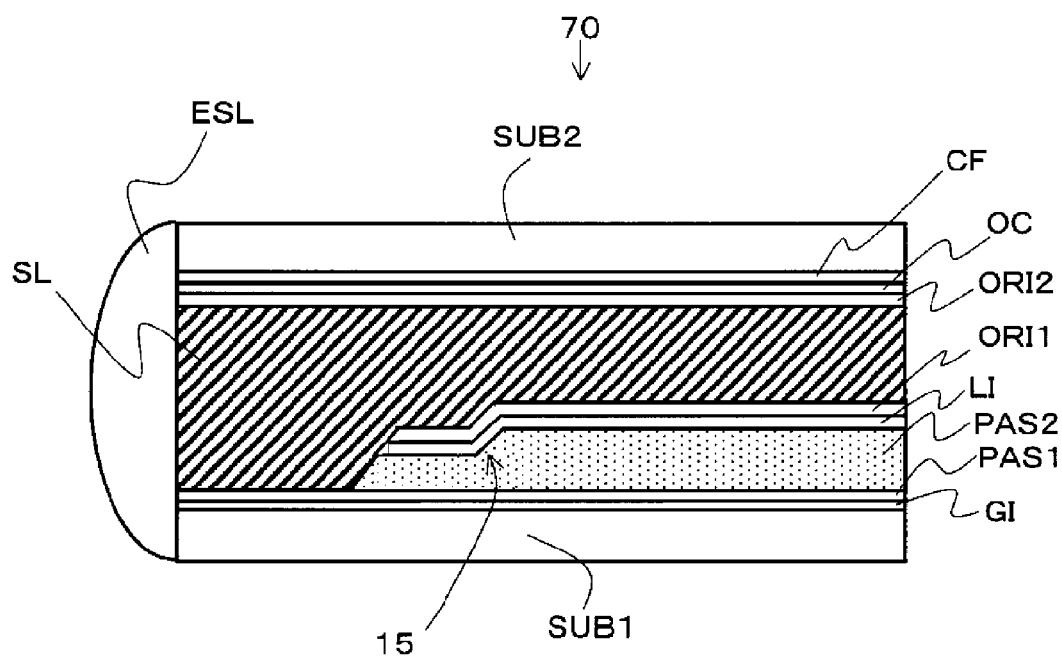
FIG. 13 is a sectional view taken along the line XIII-XIII in the vicinity of the liquid crystal injecting port illustrated in FIG. 12.

Next, a liquid crystal display device according to a third embodiment of the present invention is described. FIG. 11 is a schematic view illustrating a structure of a liquid crystal display device 300 according to the third embodiment of the present invention. FIG. 12 is an enlarged view of the vicinity of the liquid crystal injecting port 11 illustrated in FIG. 11. FIG. 13 is a sectional view taken along the line XIII-XIII in the vicinity of the liquid crystal injecting port 11 illustrated in FIG. 12. Note that, as for the insulating film, only the insulating film PAS2 is illustrated in FIG. 11.

In the liquid crystal display device 100 according to the first embodiment of the present invention, the insulating film PAS2 includes the extension portion 12 extending from the end surface of the insulating film PAS2. Alternatively, in the liquid crystal display device 300 of the third embodiment, the insulating film PAS2 includes a thin film portion 15 instead of the extension portion 12. Other structures are the same as those in the first embodiment, and portions having the same structures are denoted by the same reference symbols.

The thin film portion 15 is a portion formed so that the surface on the liquid crystal LC side comes close to the surface on the opposite side, from the inner side with respect to the end surface of the insulating film PAS2 at the position which overlaps the portion of the sealing member SL forming the liquid crystal injecting port 11, toward the end surface of the insulating film PAS2. Specifically, the thin film portion 15 is formed so that the surface of the insulating film PAS2 on the liquid crystal LC side is stepped. Therefore, the thickness of the insulating film PAS2 becomes smaller in a stepped manner from the inner side of the end surface toward the end surface. That is, the thickness between the substrates SUB1 and SUB2 becomes smaller in a stepped manner toward the end surface. The thin film portion 15 may be formed by etching the insulating film PAS2 in a stepped manner using, for example, half exposure in the photolithography method.

In the liquid crystal display device 300 according to the third embodiment of the present invention, the insulating film PAS2 includes the thin film portion 15 formed so that the surface on the liquid crystal LC side comes close to the surface on the opposite side in a stepped manner, from the inner side with respect to the end surface of the insulating film PAS2 toward the end surface. Therefore, in the region where the sealing member SL is formed, the thickness between the pair of substrates SUB1 and SUB2 becomes smaller in a stepped manner toward the end surfaces of the pair of substrates. As a result, when the substrates SUB1 and SUB2 are adhered to each other, the pressure difference to be applied to the sealing member SL with the end surface of the insulating film PAS2 being a boundary may be relieved to suppress generation of steps at both the end portions of the sealing member SL in the width direction. Therefore, it is possible to prevent air bubbles from entering, and as a result, it is possible to prevent display failure and end surface peeling.

Note that, in the third embodiment of the present invention, description is made of an example in which the thin film portion 15 is formed in a stepped manner which has a thickness reduced by one step. However, the present invention is not limited thereto. That is, a plurality of steps may be provided so that the thickness is reduced in several divided steps toward the end surface of the insulating film PAS2. In the case where the plurality of steps are provided, the thickness between the substrates SUB1 and SUB2 is gradually reduced toward the end surface of the insulating film PAS2. Therefore, it is possible to further suppress generation of steps in the sealing member SL.

Figure 14:
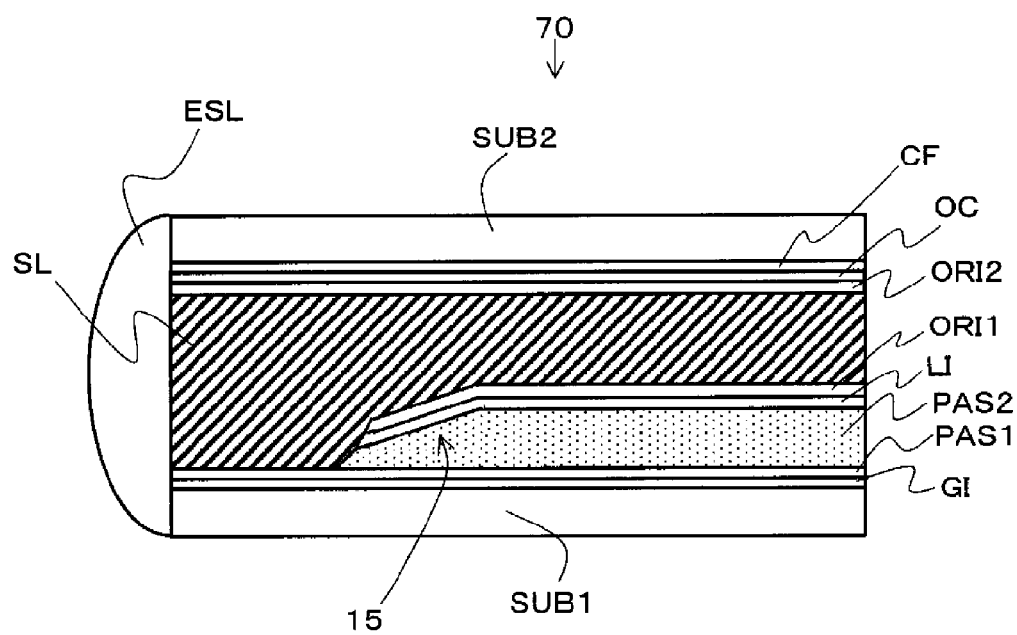
FIG. 14 is a view illustrating a liquid crystal display device according to a modified example of the third embodiment of the present invention.

Here, a modified example of the third embodiment of the present invention is described. FIG. 14 is a view illustrating the liquid crystal display device 300 according to the modified example of the third embodiment of the present invention. In the liquid crystal display device 300 of the third embodiment of the present invention, the thin film portion 15 is formed so that the thickness is reduced in a stepped manner. Alternatively, in the modified example of the third embodiment, the thin film portion 15 is formed so that the surface on the liquid crystal LC side is inclined with respect to the surface on the opposite side, from the inner side with respect to the end surface of the insulating film PAS2 toward the end surface. Other structures are the same as those in the third embodiment. Therefore, in the region where the sealing member SL is formed, the thickness between the pair of substrates SUB1 and SUB2 is gradually reduced toward the end surfaces of the pair of substrates, and hence also in the modified example of the third embodiment, similar effects as those in the third embodiment can be produced.

Fourth Embodiment

Figure 15:
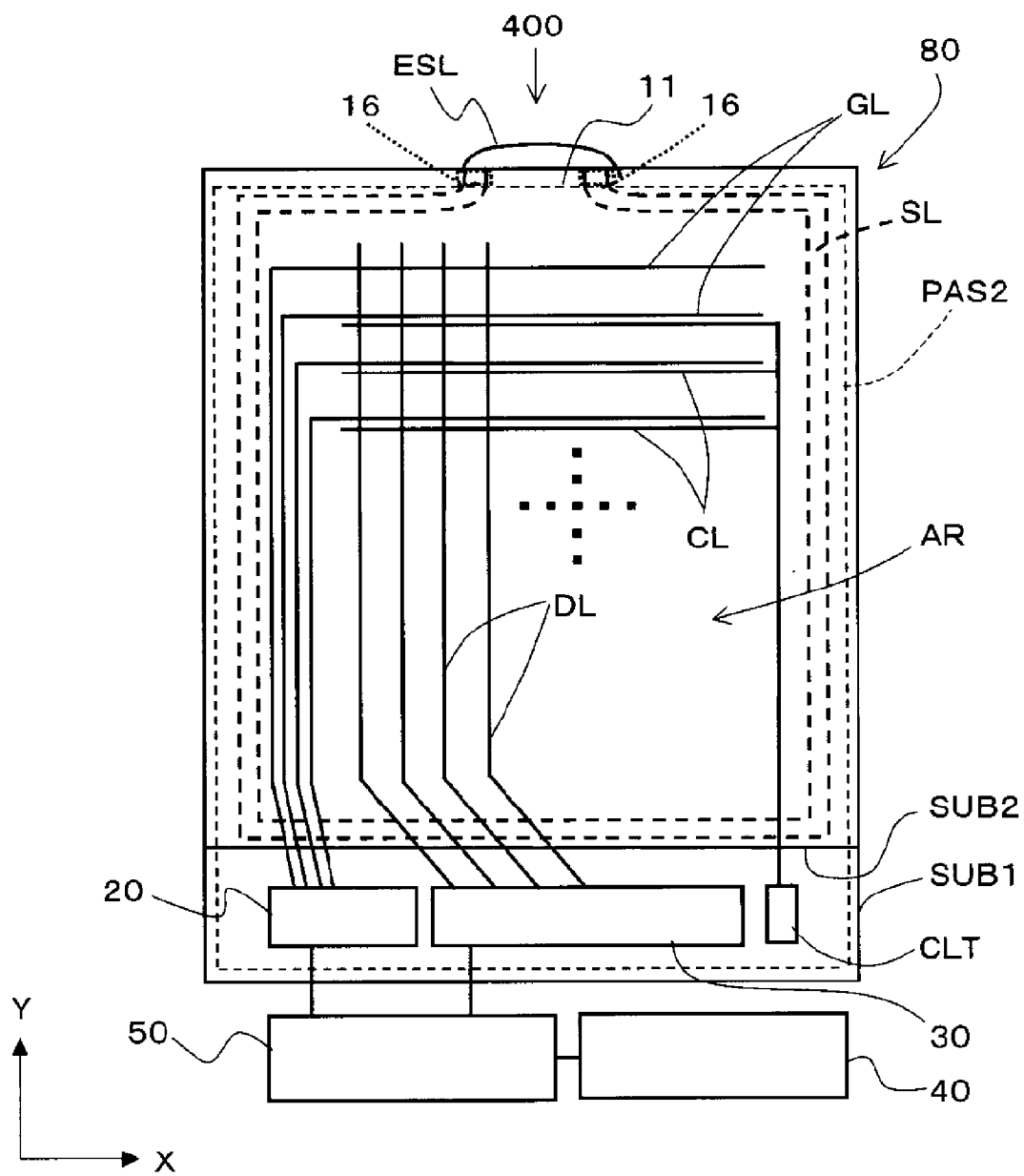
FIG. 15 is a schematic view illustrating a structure of a liquid crystal display device according to a fourth embodiment of the present invention.
Figure 16:
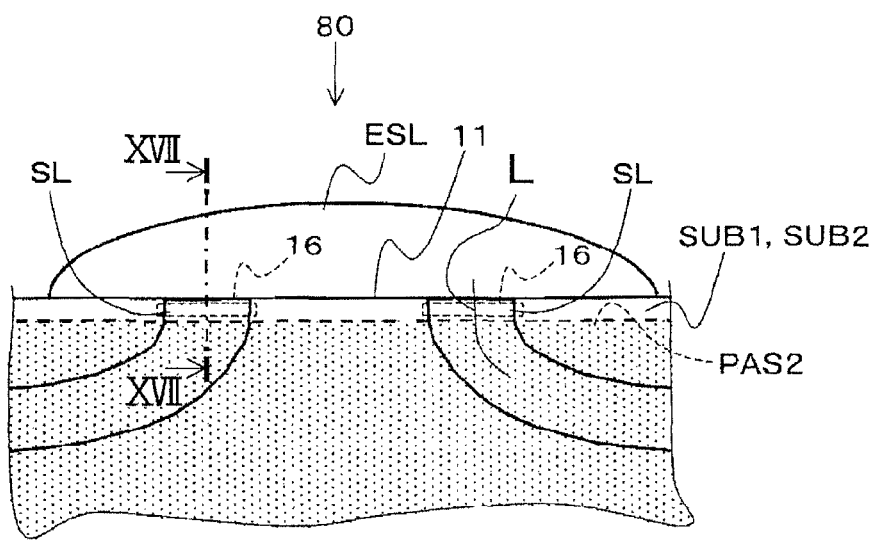
FIG. 16 is an enlarged view of a vicinity of a liquid crystal injecting port illustrated in FIG. 15.
Figure 17:
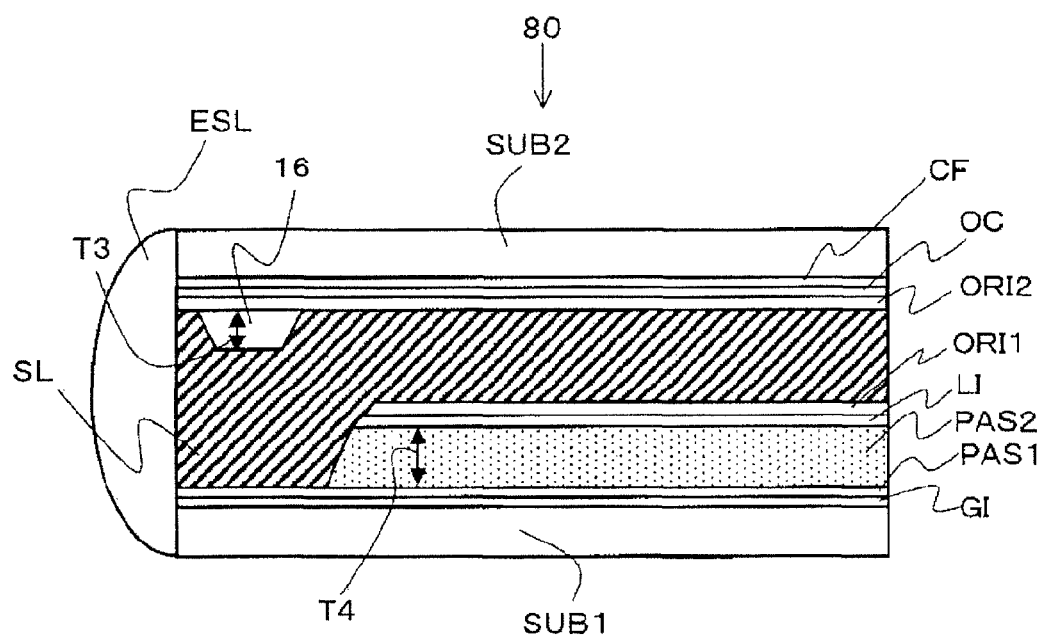
FIG. 17 is a sectional view taken along the line XVII-XVII in the vicinity of the liquid crystal injecting port illustrated in FIG. 16.
Figure 18:
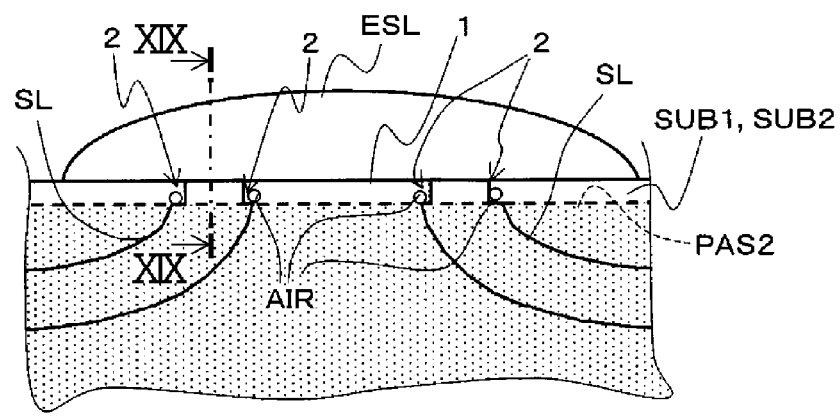
FIG. 18 is a view illustrating problems of a conventional technology.
Figure 19:
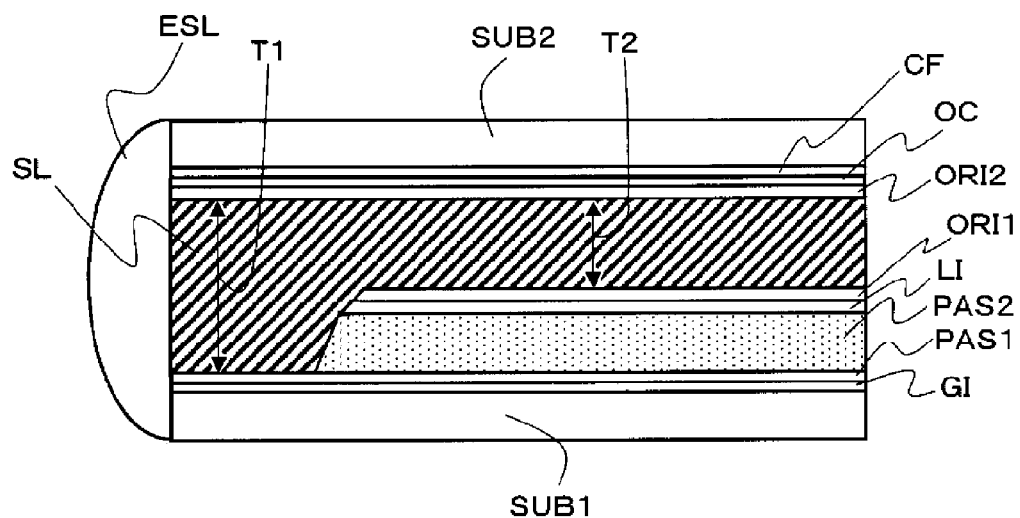
FIG. 19 is a sectional view taken along the line XIX-XIX in a vicinity of a liquid crystal injecting port illustrated in FIG. 18.

Next, a liquid crystal display device according to a fourth embodiment of the present invention is described. FIG. 15 is a schematic view illustrating a structure of a liquid crystal display device 400 according to the fourth embodiment of the present invention. FIG. 16 is an enlarged view of the vicinity of the liquid crystal injecting port 11 illustrated in FIG. 15. FIG. 17 is a sectional view taken along the line XVII-XVII in the vicinity of the liquid crystal injecting port 11 illustrated in FIG. 16. Note that, as for the insulating film, only the insulating film PAS2 is illustrated in FIG. 15.

In the liquid crystal display device 100 according to the first embodiment of the present invention, the insulating film PAS2 includes the extension portion 12, which extends from the end surface of the insulating film PAS2, at the position which overlaps the portion of the sealing member SL forming the liquid crystal injecting port 11. Alternatively, in the liquid crystal display device 400 of the fourth embodiment, a protruding portion 16 is provided on a portion of the substrate SUB2 which overlaps the portion of the sealing member SL forming the liquid crystal injecting port 11. Other structures are the same as those in the first embodiment, and portions having the same structures are denoted by the same reference symbols.

The protruding portion 16 is made of a resin formed into a columnar shape, and is formed on the portion of the substrate SUB2 which overlaps the portion of the sealing member SL forming the liquid crystal injecting port 11, the protruding portion 16 protruding from the surface of the substrate SUB2 on the liquid crystal LC side toward the surface of the substrate SUB1 on the liquid crystal LC side. Further, the protruding portion 16 is arranged between the end surface of the substrate SUB1 on which the insulating film PAS2 is formed and the end surface of the insulating film PAS2. Further, the protruding portion 16 is formed so that a cross section of the protruding portion 16, which is orthogonal to a thickness direction thereof, is symmetric with respect to the line L passing the center of the sealing member SL in the width direction thereof.

Note that, the protruding portion 16 is preferred to be formed so that a thickness T3 in a protruding direction thereof is equal to a thickness T4 of the insulating film PAS2. Further, it is preferred to set the width of the protruding portion 16 in the width direction of the sealing member SL so that the width of the protruding portion 16 is equal to the width of the sealing member SL after expansion within a range of 0 mm to 1 mm, or the width of the protruding portion 16 is larger than the width of the sealing member SL after expansion. By setting the width of the protruding portion 16 as described above, the opening of the liquid crystal injecting port 11 is not reduced, and hence the takt time of the injection of the liquid crystal LC is not influenced. Further, the protruding portion 16 is formed by a photolithography method similarly to, for example, a spacer on color filter (SOC).

The liquid crystal display device 400 according to the fourth embodiment of the present invention includes the protruding portion 16, which is formed at a position which overlaps the portion of the sealing member SL forming the liquid crystal injecting port 11, the protruding portion 16 protruding from the surface of the substrate SUB2 on the liquid crystal LC side toward the surface of the substrate SUB1 on the liquid crystal LC side. Further, the protruding portion 16 is arranged between the end surface of the substrate SUB1 on which the insulating film PAS2 is formed and the end surface of the insulating film PAS2, and further, the cross section of the protruding portion 16, which is orthogonal to the thickness direction thereof, is symmetric with respect to the line L passing the center of the sealing member SL in the width direction thereof. As a result, owing to the protruding portion 16, it is possible to increase the thickness between the pair of substrates SUB1 and SUB2 at a position of the center of the sealing member SL in the width direction. In this manner, it is possible to suppress generation of steps at both the end portions of the sealing member SL in the width direction. Therefore, it is possible to prevent air bubbles from entering, and as a result, it is possible to prevent display failure and end surface peeling.

Note that, in the fourth embodiment of the present invention, description is made of an example in which the protruding portion 16 is formed on the substrate SUB2 side. However, the present invention is not limited thereto, and the protruding portion 16 may be formed on the substrate SUB1 side.

Further, in the first to third embodiments, description is made of examples in which the extension portions 12, 13, and 14 and the thin film portion 15 are formed on the insulating film PAS2 made of an organic material. However, the present invention is not limited thereto. For example, the extension portions 12, 13, and 14 and the thin film portion 15 may be formed on an insulating film made of an inorganic material.

While there have been described what are at present considered to be certain embodiments of the invention, it will be understood that various modifications may be made thereto, and it is intended that the appended claims cover all such modifications as fall within the true spirit and scope of the invention.

What is claimed is:

1. A liquid crystal display device, comprising:
  a pair of substrates arranged opposed to each other via liquid crystal;
  an insulating film formed on at least one substrate of the pair of substrates up to a vicinity of an end surface of the at least one substrate; and
  a sealing member for enabling injection of the liquid crystal between the pair of substrates and adhering the pair of substrates to each other, the sealing member including a liquid crystal injecting port through which the liquid crystal is injected, wherein:
  the insulating film comprises an extension portion, which extends from an end surface of the insulating film at a position which overlaps a portion of the sealing member forming the liquid crystal injecting port, up to the vicinity of the end surface of the at least one substrate on which the insulating film is formed; and
  the extension portion is formed so that a cross section of the extension portion, which is orthogonal to a thickness direction thereof, is symmetric with respect to a line passing a center of the sealing member in a width direction thereof, and further, a width of the extension portion in the width direction of the sealing member is formed smaller than a width of the sealing member obtained after adhering the pair of substrates to each other.

2. The liquid crystal display device according to claim 1, wherein the insulating film is made of an organic material.

* * * * *